US011235734B2

(12) United States Patent
Nagata

(10) Patent No.: US 11,235,734 B2
(45) Date of Patent: Feb. 1, 2022

(54) PROXIMITY BASED VEHICLE SECURITY SYSTEM

(71) Applicant: Toyota Motor Engineering & Manufacturing North America, Inc., Plano, TX (US)

(72) Inventor: Katsumi Nagata, Foster City, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/785,390

(22) Filed: Feb. 7, 2020

(65) Prior Publication Data

US 2021/0245711 A1    Aug. 12, 2021

(51) Int. Cl.
| B60R 25/30 | (2013.01) |
| H04N 7/18 | (2006.01) |
| H04N 5/247 | (2006.01) |
| B60R 25/10 | (2013.01) |
| H04N 5/232 | (2006.01) |
| H04W 4/46 | (2018.01) |

(52) U.S. Cl.
CPC ............ *B60R 25/305* (2013.01); *B60R 25/10* (2013.01); *H04N 5/23218* (2018.08); *H04N 5/247* (2013.01); *H04N 7/181* (2013.01); *H04N 7/188* (2013.01); *H04W 4/46* (2018.02)

(58) Field of Classification Search
CPC ......... B60R 25/10; H04N 5/247; H04N 7/181
See application file for complete search history.

(56) References Cited

U.S. PATENT DOCUMENTS

| 4,734,725 | A | 3/1988 | Bierman |
| 5,793,420 | A | 8/1998 | Schmidt |
| 7,100,190 | B2 | 8/2006 | Johnson et al. |
| 8,063,934 | B2 | 11/2011 | Donato |
| 8,576,069 | B2 | 11/2013 | Nadeem et al. |
| 8,711,197 | B2 | 4/2014 | Dickerson et al. |
| 9,633,318 | B2 | 4/2017 | Plante |
| 9,633,561 | B2 | 4/2017 | Stanek et al. |
| 9,767,675 | B2 | 9/2017 | Hutchings |
| 9,934,627 | B1 | 4/2018 | Brinkmann et al. |

(Continued)

OTHER PUBLICATIONS

Future Internet 2013, "Sending Safety Video over WiMAX in Vehicle Communications" by Huang et al.

*Primary Examiner* — Zhubing Ren
(74) *Attorney, Agent, or Firm* — Snell & Wilmer LLP

(57) ABSTRACT

Methods, systems, and apparatus for a vehicle security system. The vehicle security system includes a first camera positioned on a first vehicle and configured to capture first image data of a surrounding environment. The vehicle security system includes a memory that is configured to store the first image data. The vehicle security system includes a processor. The processor is configured to determine that an object or an action of the object within the surrounding environment is different than a baseline of the surrounding environment based on the first image data. The processor is configured to store, in the memory, the first image data based on the determination and cause a second camera positioned on a second vehicle or on an infrastructure to activate to capture second image data of the surrounding environment as the movement of the object in the interest was predicted.

20 Claims, 5 Drawing Sheets

(56) References Cited

U.S. PATENT DOCUMENTS

| | | | |
|---|---|---|---|
| 10,046,761 B2 | 8/2018 | Meyer et al. | |
| 10,218,943 B2 | 2/2019 | Kessel | |
| 2009/0157268 A1* | 6/2009 | Chiba | G08G 1/168 |
| | | | 701/53 |
| 2009/0234859 A1 | 9/2009 | Grigsby et al. | |
| 2011/0019873 A1* | 1/2011 | Yamato | G08G 1/165 |
| | | | 382/103 |
| 2014/0118140 A1 | 5/2014 | Amis | |
| 2014/0218520 A1* | 8/2014 | Teich | H04N 5/2354 |
| | | | 348/143 |
| 2015/0325120 A1* | 11/2015 | Cho | G08G 1/163 |
| | | | 348/149 |
| 2015/0356864 A1* | 12/2015 | Hutchings | G08G 1/096741 |
| | | | 348/148 |
| 2021/0053489 A1* | 2/2021 | Golov | G06T 7/246 |

* cited by examiner

PROXIMITY BASED VEHICLE SECURITY SYSTEM

BACKGROUND

Field

The present disclosure relates to systems and methods for a proximity based vehicle security system.

Description of the Related Art

Vehicle security systems, such as vehicle anti-theft systems, are reactive systems that detect unusual activities or objects within the surrounding external environment of the vehicle. These vehicle security systems may monitor or detect the surrounding external environment of the vehicle and sound an alarm or otherwise alert people in the vicinity of the vehicle that an unusual activity or object is within proximity of the vehicle. In some instances, the vehicle security system may be equipped with a camera that monitors the surrounding environment of the vehicle while it is parked. This camera, however, may not be effective in capturing the unusual activity or object, such as the accident or break-in due to its limited field-of-view. If the camera may be rotated, the camera is unable to monitor the unusual activity or object in blind-spots or if the object moves out-of-range of the camera, e.g., if a hit-and-run vehicle travels far enough from the accident site.

Accordingly, there is a need for a system and a method to track, monitor, follow or otherwise continue capturing image data of the unusual activity or object when the object exits the field-of-view of a camera on the vehicle.

SUMMARY

In general, one aspect of the subject matter described in this disclosure may be embodied in a vehicle security system. The vehicle security system includes a first camera positioned on a first vehicle. The first camera is configured to capture first image data of a surrounding environment. The vehicle security system includes a memory that is configured to store the first image data. The vehicle security system includes a processor. The processor is coupled to the first camera and the memory. The processor is configured to determine that an object or an action of the object within the surrounding environment is different than a baseline of the surrounding environment based on the first image data. The processor is configured to store, in the memory, the first image data based on the determination and cause a second camera positioned on a second vehicle or on an infrastructure to activate to capture second image data of the surrounding environment.

These and other embodiments may optionally include one or more of the following features. The processor may be configured to obtain or determine a location of the first camera. The processor may be configured to determine that a location of the second camera is within a threshold distance of the location of the first camera. The processor may be configured to cause the second camera to activate based on the determination that the location of the second camera is within the threshold distance of the location of the first camera and the determination that the object or the action of the object within the surrounding environment is different than the baseline of the surrounding environment.

The processor may be configured to track a direction of movement of the object within the surrounding environment. The processor may be configured to determine that the object will exit a field-of-view of the first camera and that the object will enter a field-of-view of the second camera based on the direction of movement of the object. The processor may be configured to store and capture, in the memory and using the second camera, the second image data. The processor may be an electronic control unit included within or coupled to the first vehicle.

The vehicle security system may include a communication device. The communication device may be coupled to the first vehicle. The communication device may be configured to communicate with a second vehicle. The electronic control unit may be configured to transmit a signal to the second vehicle to cause the second camera to activate.

In another aspect, the subject matter may be embodied in a security system. The security system includes a sensor configured to detect sensor data. The security system includes a first camera and a second camera. The second camera is positioned on a vehicle or on an infrastructure. The first camera is configured to capture first image data of a surrounding environment and the second camera is configured to capture second image data of the surrounding environment. The security system includes a memory. The memory is configured to store the first image data and the second image data. The security system includes a processor coupled to the sensor, the first camera and the memory. The processor is configured to determine that an object or an action of the object within the surrounding environment is different than a baseline of the surrounding environment based on the first image data or the sensor data. The processor is configured to store and capture, in the memory and using the first camera, the first image data based on the determination. The processor is configured to determine that the second camera is within a threshold distance of the first camera. The processor is configured to cause the second camera to activate to capture the second image data of the surrounding environment.

In another aspect, the subject matter may be embodied in a method for capturing image data of a surrounding environment. The method includes detecting, using a sensor, sensor data of a surrounding environment of a first vehicle. The method includes capturing, using a first camera positioned on the first vehicle, first image data of the surrounding environment of the first vehicle. The method includes determining, by a processor, that an object or an action of the object within the surrounding environment is unusual. The method includes storing, by the processor in a memory, the first image data. The method includes determining, by the processor, that a second camera is within a threshold distance of the first camera. The method includes activating, by the processor, the second camera to capture the second image data of the surrounding environment.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for a vehicle security system. Particular embodiments of the subject matter described in this disclosure may be implemented to realize one or more of the following advantages. The vehicle security system detects, determines or otherwise identifies that an unusual activity or object has occurred in the environment surrounding the vehicle. The vehicle security system recognizes objects in the environment surrounding the vehicle and may determine whether the object is behaving unusually. If the object is behaving unusually, the vehicle security system may activate one or more vehicle cameras along with other cameras positioned on other vehicles or infrastructure to capture image data of the entire environment surrounding the vehicle. By using multiple cameras positioned on the vehicle, on other vehicles and/or on infrastructure near the vehicle, the vehicle security system captures image data of the entire surrounding environment from different vantage points, different perspectives and different field-of-views of the unusual activity or object and/or environment. The different vantage points, perspectives and field-of-views may form a complete pictorial representation of the environment.

Other benefits and advantages include the capability to track and follow the unusual activity or object as the object exits the field-of-view of the vehicle camera, infrastructure camera or camera of another vehicle. For example, as the object exits the field-of-view of the vehicle camera, the vehicle security system may activate another camera in proximity to the vehicle to follow and continue to store image data that captures the movements of the object. This allows the vehicle security system to track the object and continue to monitor the object even when the object has left the scene of the initial suspicious conduct.

Additionally, the vehicle security system may alert a third-party and/or provide the captured image data to the third-party. For example, the vehicle security system may alert the police of the unusual activity of a suspicious person and track and follow the suspicious person. The vehicle security system may provide the captured image data to the police or to an insurance company as evidence in an investigation or as evidence for a claim, for example.

Figure 1:
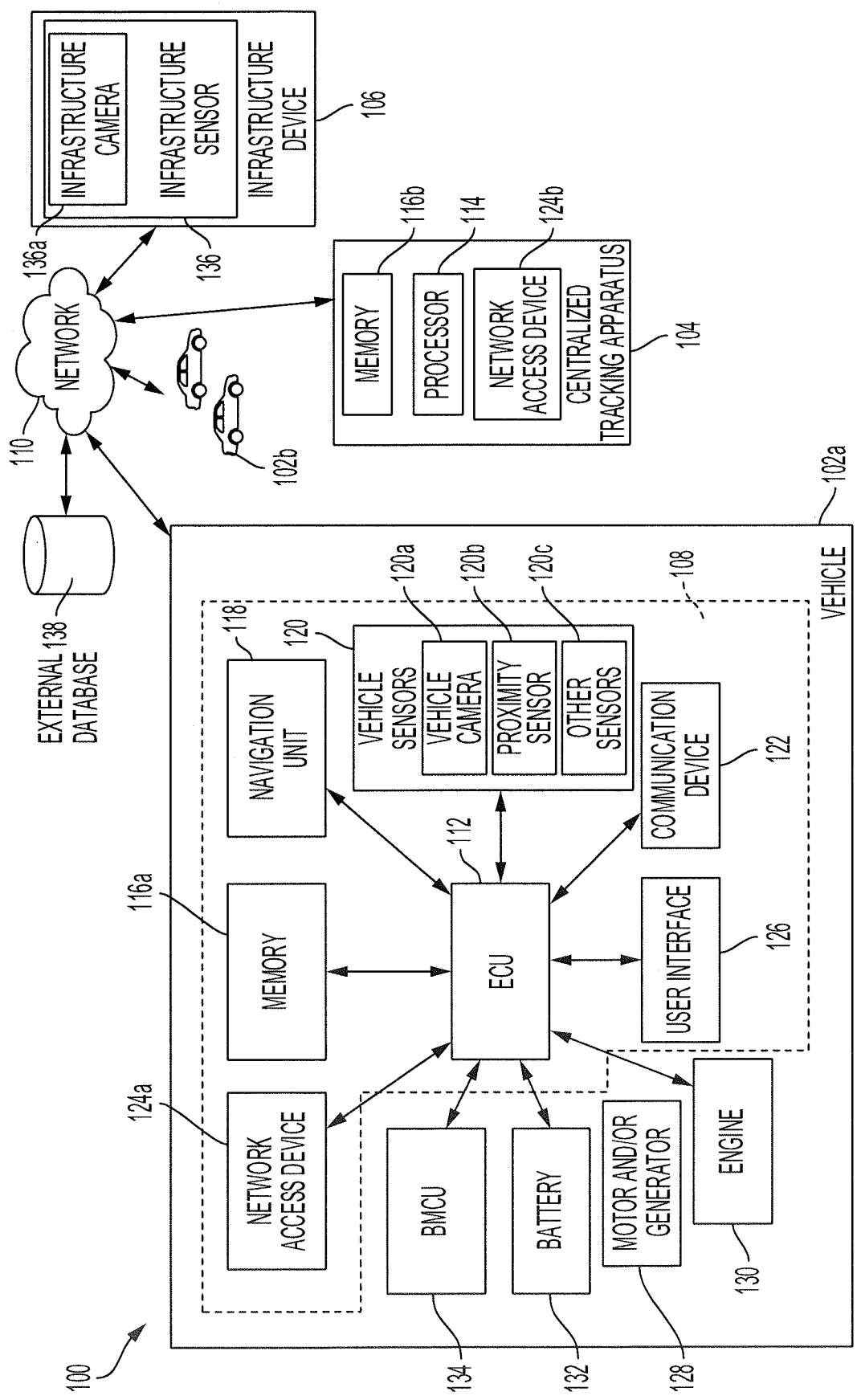
FIG. 1 is a block diagram of an example vehicle security system according to an aspect of the invention.

FIG. 1 is a block diagram of a vehicle security system 100. The vehicle security system 100 may include a vehicle monitoring apparatus 108 that may retro-fitted, coupled to, include or be included within a vehicle 102a-b. The vehicle security system 100 may be coupled to, connected to or include one or more other devices or entities, such as one or more other vehicles 102b, a centralized tracking apparatus 104 and/or an infrastructure device 106. The infrastructure device 106 may be a device on a building, light pole, traffic signal or sign or other structure.

The vehicle security system 100 may have a network 110 that links the multiple entities to share information. The network 110 may be a Dedicated Short-Range Communication (DSRC) network, a local area network (LAN), a wide area network (WAN), a cellular network, the Internet, or combination thereof, that connects, couples and/or otherwise communicates among the multiple entities.

The vehicle security system 100 monitors the environment surrounding the vehicle 102a and detects an unusual activity or object in the environment surrounding the vehicle 102a. For example, the unusual activity or object may be a suspicious person walking around the parking lot or neighborhood, and a camera on a parked vehicle within the parking lot may detect the suspicious person walking around the parking lot or neighborhood.

The vehicle security system 100 captures image data of the unusual activity or object and records and/or stores the image data. The vehicle security system 100 may capture image data from multiple sources that are positioned on the vehicle 102a, on other vehicles 102b or on the surrounding infrastructure to capture image data of the entire environment from various vantage points, field-of-views and/or perspectives. The vehicle security system 100 may provide the image data to a third-party, such as a government agency or insurance company, to assist with the reporting of the unusual activity or object.

The vehicle security system 100 may include or be retro-fitted or otherwise coupled with or coupled to one or more vehicles 102a-b. A vehicle 102a-b is a conveyance capable of transporting a person, an object, or a permanently or temporarily affixed apparatus. The vehicle 102a-b may be a self-propelled wheeled conveyance, such as a car, sports utility vehicle, truck, bus, van or other motor, battery or fuel cell driven vehicle. For example, the vehicle 102a-b may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous.

The vehicle security system 100 may have a vehicle monitoring apparatus 108 within one or more vehicles 102a-b. The vehicle monitoring apparatus 108 may be within, coupled to or otherwise connected to the vehicle 102a-b and/or connected to other vehicle components. The vehicle monitoring apparatus 108 and centralized tracking apparatus 104 may include one or more processors, such as an electronic control unit (ECU) 112 or the processor 114 and a memory 116a-b, respectively. The vehicle monitoring apparatus 108 may include other components, such as a navigation unit 118, one or more vehicle sensors 120, a communication device 122, a network access device 124a and/or a user interface 126. The vehicle monitoring apparatus 108 may couple, connect to, and/or include one or more vehicle components such as the motor and/or generator 128, the engine 130, the battery 132, and/or the battery management control unit (BMCU) 134.

The ECU 112 may be implemented as a single ECU or as multiple ECUs. The ECU 112 may be electrically coupled to some or all of the other components within the vehicle 102a-b, such as the motor and/or generator 128, the engine 130, the battery 132, the battery management control unit (BMCU) 134, the memory 116a, the network access device 124a and/or one or more vehicle sensors 120. The ECU 112 may include one or more processors or controllers specifically designed for sensing, detecting, measuring and/or otherwise determining or obtaining the various parameters to detect an unusual activity or object and activate various sensors and cameras surrounding the vehicle 102a. The ECU 112 may be coupled to a memory 116a and execute instructions that are stored on the memory 116a.

Similarly, the processor 114 may be implemented as a single processor or as multiple processors. The processor 114 may include one or more processors or controllers specifically designed for sensing, detecting, or identifying unusual activities or objects and activating cameras and sensors to capture image data of the unusual activity or object. The processor 114 may be coupled to the memory 116b.

The memory 116a may be coupled to the ECU 112 and store instructions that the ECU 112 executes. Similarly, the memory 116b may be coupled to the processor 114 and store instructions that the processor 114 executes. The one or more memories 116a-b may include one or more of a Random Access Memory (RAM) or other volatile or non-volatile memory. The one or more memories 116a-b may be a non-transitory memory or a data storage device, such as a hard disk drive, a solid-state disk drive, a hybrid disk drive, or other appropriate data storage, and may further store machine-readable instructions, which may be loaded and executed by the ECU 112 or processor 114, respectively.

The vehicle monitoring apparatus 108 may include a user interface 126. The vehicle monitoring apparatus 108 may display one or more notifications and/or alerts. The one or more notifications may notify or suggest to the user or driver that an unusual activity or object is within a vicinity of the vehicle 102a. The one or more notifications may alert the user that a camera is activated and/or recording. The user interface 126 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 126 may receive user input that may include configuration settings for one or more user preferences, for example.

The vehicle security system 100 may include one or more network access devices 124a-b. For example, the vehicle monitoring apparatus 108 within the one or more vehicles 102a-b includes a network access device 124a and the centralized tracking apparatus 104 includes a network access device 124b. The network access devices 124a-b may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 124a-b may transmit data to and receive data among the entities, such as the centralized tracking apparatus 104, the vehicle monitoring apparatus 108 of the vehicles 102a-b and/or an infrastructure device 106.

The vehicle monitoring apparatus 108 may include a communication device 122. The communication device 122 may include vehicle-to-infrastructure (V2I) communication that communicates with an infrastructure device 106. The communication device 122 may include vehicle-to-vehicle (V2V) communication that communicates with another vehicle 102b that is in proximity to the vehicle 102a. The communication device 122 communicates V2I and/or V2V to activate various cameras and/or sensors of the infrastructure or other vehicle 102b, respectively.

The vehicle monitoring apparatus 108 may include a navigation unit 118. The navigation unit 118 may be integral to the vehicle 102a-b or a separate unit coupled to the vehicle 102a-b. In some implementations, the vehicle 102a-b may include a Global Positioning System (GPS) unit (not shown) for detecting location data and date/time information instead of the navigation unit 118. In that regard, the ECU 112 may perform the functions of the navigation unit 118 based on data received from the GPS unit. At least one of the navigation unit 118 or the ECU 112 may predict or propose a route set that includes a starting location and a destination location. The navigation unit 118 or the ECU 112 may perform navigation functions. Navigation functions may include, for example, route and route set prediction, providing navigation instructions, and receiving user input such as verification of predicted routes and route sets or destinations.

The navigation unit 118 may provide and obtain navigational map information. The navigational map information may include a timestamp, a current location, a direction of vehicle 102a-b, a starting location, a destination location and/or a route between the starting location or current location and the destination location of the vehicle 102a-b and may include a memory (not shown) for storing route data. The navigation unit 118 may receive data from other sensors capable of detecting data corresponding to location information. For example, the other sensors may include a gyroscope or an accelerometer.

The vehicle monitoring apparatus 108 may include one or more vehicle sensors 120. The one or more vehicle sensors 120 may include a vehicle camera 120a and a proximity sensor 120b. The vehicle camera 120a may be positioned on or coupled to the vehicle 102a-b and capture image data of the external surrounding environment of the vehicle 102a-b. The image data may be a video or still images of the surrounding environment and may or may not include audio. The proximity sensor 120b may use radar, lidar, optical, radio waves or other detection methods to detect activity or objects within the surrounding environment of the vehicle 102a-b. The one or more vehicle sensors 120 may include one or more other sensors 120c, such as a pressure sensor that measures contact with the vehicle 102a and/or a thermal or infrared sensor to detect the presence, lack of presence or proximity of the object to the vehicle 102a.

Similarly, the infrastructure device 106 may include one or more infrastructure sensors 136 including an infrastructure camera 136a. The infrastructure camera 136a may be positioned on or coupled to the infrastructure device 106 on an infrastructure. The infrastructure camera 136a may capture image data of the external surrounding environment of the infrastructure. The image data may be a video or still images of the surrounding environment and may or may not include audio.

The vehicle security system 100 may couple, connect to, and/or include one or more vehicle components. The one or more vehicle components may include a motor and/or generator 128. The motor and/or generator 128 may convert electrical energy into mechanical power, such as torque, and may convert mechanical power into electrical energy. The motor and/or generator 128 may be coupled to the battery 132. The motor and/or generator 128 may convert the energy from the battery 132 into mechanical power, and may provide energy back to the battery 132, for example, via regenerative braking. In some implementations, the vehicle 102a-b may include one or more additional power generation devices such as the engine 130 or a fuel cell stack (not shown). The engine 130 combusts fuel to provide power instead of and/or in addition to the power supplied by the motor and/or generator 128.

The battery 132 may be coupled to the motor and/or generator 128 and may provide electrical energy to and receive electrical energy from the motor and/or generator 128. The battery 132 may include one or more rechargeable batteries.

The BMCU 134 may be coupled to the battery 132 and may control and manage the charging and discharging of the battery 132. The BMCU 134, for example, may measure, using battery sensors, parameters used to determine the state of charge (SOC) of the battery 132. The BMCU 134 may control the battery 132 to maintain a reserve power explicitly for providing a sudden burst of electrical energy to be converted into power for the transmission to drive or move the multiple wheels of the vehicles 102*a-b*.

The vehicle security system 100 may include or be coupled to the external database 138. A database is any collection of pieces of information that is organized for search and retrieval, such as by a computer, and the database may be organized in tables, schemas, queries, reports, or any other data structures. A database may use any number of database management systems. The external database 138 may include a third-party server or website that stores or provides information. The information may include real-time information, periodically updated information, or user-inputted information. A server may be a computer in a network that is used to provide services, such as accessing files or sharing peripherals, to other computers in the network.

The external database 138 may be a map database that has maps of one or more locations of infrastructure devices 106 on one or more structures and/or the locations of one or more vehicles 102*b* with cameras. The maps may include information, such as the location of vehicles 102*b* that have cameras and/or infrastructure devices 106 that have cameras. In some implementations, the external database 138 may be stored within centralized tracking apparatus 104, such as in the memory 116*b*, or may be separate from the centralized tracking apparatus 104.

The vehicle security system 100 may include or be coupled to one or more vehicles 102*a-b*. The vehicle security system 100 may use the communication device 122 to communicate among the vehicles 102*a-b* and/or infrastructure devices 106 to activate one or more vehicle cameras 120*a* to detect or capture an unusual activity or object. The vehicle 102*b* may include the vehicle monitoring apparatus 108, the one or more vehicle components and other similar components that perform similar functions as the vehicle 102*a*.

Figure 2:
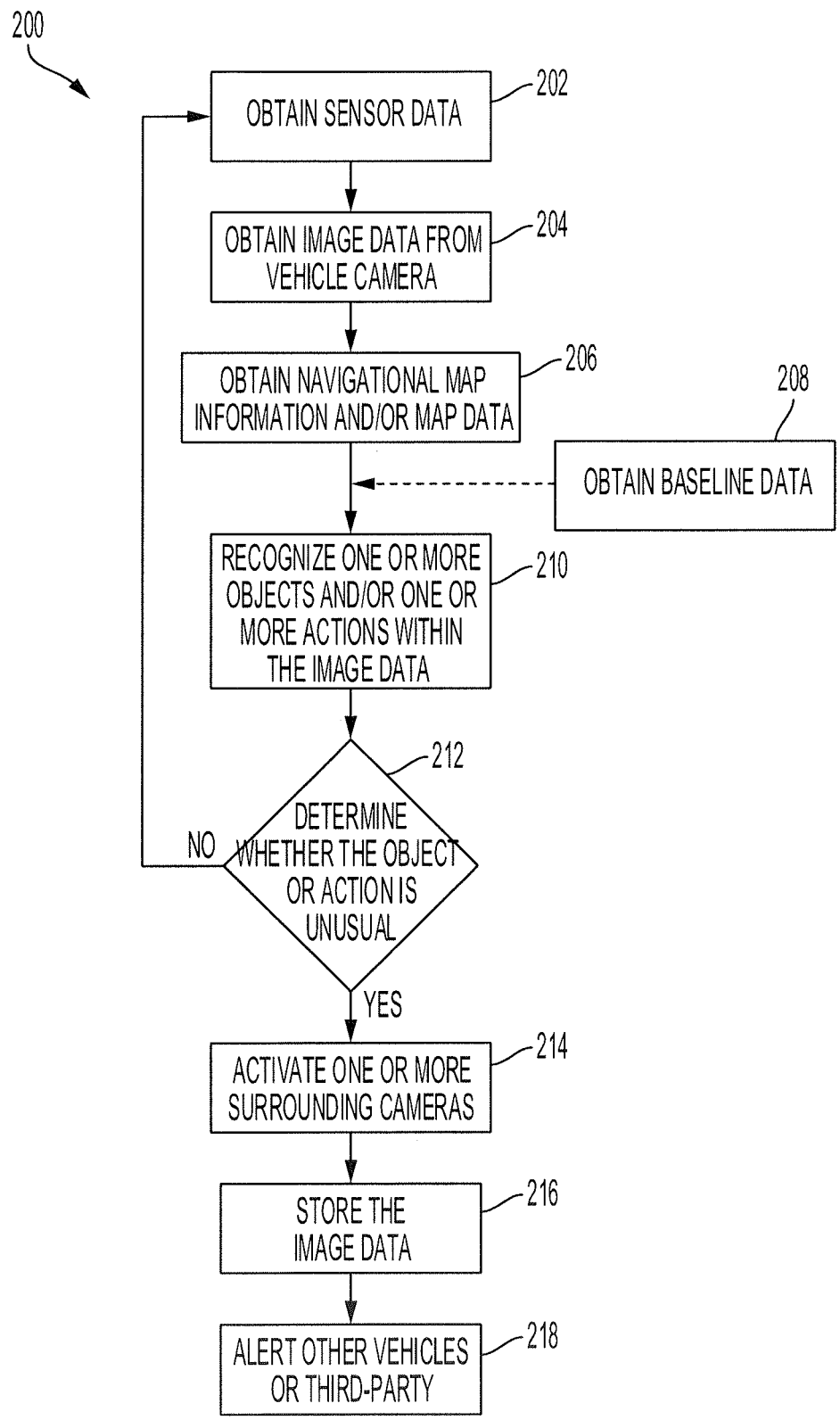
FIG. 2 is a flow diagram of an example process for activating one or more cameras to capture image data of an unusual activity or object using the vehicle security system of FIG. 1 according to an aspect of the invention.

FIG. 2 is a flow diagram of a process 200 for activating one or more cameras 120*a*, 136*a* to capture image data of an unusual activity or object. One or more computers or one or more data processing apparatuses, for example, the ECU 112 of the vehicle security system 100 or the processor 114 of the centralized tracking apparatus 104 of the vehicle security system 100, appropriately programmed, may implement the process 200.

The vehicle security system 100 obtains sensor data (202). The vehicle security system 100 may use the sensor data to detect or determine whether an unusual activity or object is in proximity or in the surrounding environment of the vehicle 102*a*. An unusual object is an object that is not normally found in the baseline environment. An unusual activity is an action or motion of the object that is not normally performed by the object, such as a throwing, hammering motion, approaching the vehicle 102*a* too quickly, or getting too close to the vehicle 102*a*. Generally, an unusual activity or object is an object and/or a motion or action of the object that is different than an established baseline that is representative of the objects found in the environment and their corresponding motions and actions.

The vehicle security system 100 may use a vehicle camera 120*a* and/or a proximity sensor 120*b* to detect whether the object is approaching or contacts the vehicle 102*a*. The vehicle camera 120*a* and/or the proximity sensor 120*b* may detect the relative distance and the change in the relative distance over time between the object and the vehicle 102*a* to determine whether the object is approaching the vehicle 102*a*. Other sensors 120*c*, such as a thermal or infrared sensor, may be used to detect the presence, lack of presence and proximity of the object.

The vehicle security system 100 obtains image data (204). The vehicle security system 100 may activate the vehicle camera 120*a* and use the vehicle camera 120*a* to capture image data including a field-of-view of the environment surrounding and in proximity to or near the vehicle 102*a*. The image data may be used to capture, detect or determine an unusual activity or object and/or may be used to determine when the unusual activity or object exits the field-of-view (FOV) of one camera and/or enters the FOV of another camera to transition to or activate the other camera to continue capturing image data of the unusual activity or object.

The vehicle security system 100 obtains navigational map information and/or map data (206). The vehicle security system 100 may use the navigation unit 118 to obtain the navigational map information and/or map data. The navigational map information may include a current location of the vehicle 102*a* and the map data may include one or more locations of one or more cameras 120*a*, 136*a* surrounding the vehicle 102*a*. In some implementations, the vehicle security system 100 may provide the current location and the direction of the vehicle 102*a*, which may be extracted from the navigational map information, to the external database 138 and obtain the map data from the external database 138. The one or more locations of the one or more cameras 120*a*, 136*a* may be locations of other vehicles 102*b* and/or infrastructure devices 106 on an infrastructure, such as a building, light pole, sign post or other structure or facility.

Once the current location and the direction of the vehicle 102*a* are known, the vehicle security system 100 may obtain baseline data for the surrounding area near the current location of the vehicle 102*a* (208). The vehicle security system 100 may provide the current location of the vehicle 102*a* to the external database 138 and receive from the external database 138 baseline data. In some implementations, the baseline data is stored in the memory 116*b* of the centralized tracking apparatus 104. The baseline data may include information regarding the normal objects present at or near, such as within a threshold distance, of the current location of the vehicle 102. The baseline data may also include information regarding the normal motions or activities that the objects may perform. An object may be normal if the object is present at or near the current location of the vehicle 102*a* an amount or percentage of occurrences in a time period, e.g., when a frequency or ratio is greater than or equal to a threshold amount. Otherwise, the object may be determined to be abnormal or unusual when the amount or percentage of occurrences is less than the threshold amount. For example, when the object may be identified from the captured image data in the surrounding environment around or near that location more than approximately 5% of the time, the object may be considered normally in the environment. Similarly, a motion or activity may be normal when the object is found to be performing the activity or motion an amount or percentage of time, e.g., when the frequency or ratio is greater than or equal to a threshold amount. Otherwise, the motion or activity may be abnormal or unusual when the amount or percentage of time is less than the threshold amount. The vehicle security system 100 may have previously collected sensor data and image data from various sensors and used artificial intelligence to model the baseline normal objects and activities or motions of the objects.

In some implementations, the vehicle security system 100 may use artificial intelligence and/or machine algorithms to determine or generate the baseline data. As the vehicle security system 100 continues to collect sensor data and image data at different locations, the vehicle security system 100 may update the baseline data with the collected sensor data and/or image data to determine which objects and/or activities of the object are determined to be normal. For example, the vehicle security system 100 may identify a company logo or name of a package delivery truck and/or weekly garbage collection trunk and determine that these vehicles are in the area of the location during certain times of the week, and thus, may consider these objects or vehicles as normally part of the baseline data due to their regular, periodic or frequent appearances within the sensor data and/or image data.

The vehicle security system 100 may recognize one or more objects and/or one or more motions or actions (hereinafter, referred to as "activity") of the one or more objects (210). The vehicle security system 100 may recognize the object and/or activity from within the image data. In order to recognize the object, the vehicle security system 100 may model or outline frames of objects within the image data and compare the model or outline to a stored library of objects (or "library object"). The vehicle security system 100 matches the model or the outline of the frame or skeleton of an object to a library object to identify or recognize each object in the image data. The vehicle security system 100 may continue to update and refine its object recognition capabilities using artificial intelligence and/or machine algorithms.

For example, the vehicle security system 100 may learn to identify and recognize various coupled objects coupled to the object, such as a hat on a person or grocery bags that the person is holding, and similarly, the vehicle security system 100 may determine whether these coupled objects would be unusual or abnormal in comparison to the baseline data for the current location of the vehicle 102a. In another example, the vehicle security system 100 may use artificial intelligence to learn specific details of or profile the object, such as the make/model/year of a surrounding vehicle 102b, to determine whether the surrounding vehicle 102b is normally in the surrounding environment.

Once identified, the vehicle security system 100 may identify the object in each image frame from the image data and track the differences in position of the frame or the skeleton of the object through each image frame over a period of time to determine the motion or activity of the object over the period of time. The vehicle security system 100 may combine the image data with the sensor data, such as measurements of the rate of change of the motion of the object, to determine different characteristics of the motion or activity of the object over the period of time.

Next, the vehicle security system 100 determines whether the object or the activity of the object that is recognized from the image data is unusual or abnormal (212). The vehicle security system 100 compares the object or the activity of the object to the baseline data. For example, the vehicle security system 100 compares the object to the normal objects within the baseline data for the current location of the vehicle 102a. If the recognized object is not recognized or among the normal objects in the baseline data for the current location of the vehicle 102a, the vehicle security system 100 may determine that the recognized object is unusual or abnormal. For example, the vehicle camera 120a may recognize or identify a suspicious person within the proximity of the vehicle 102a, such as within the parking lot, when the baseline data indicates that a person is not normally present within the parking lot at a particular time, such as at 2 a.m. in the morning.

Similarly, even if the vehicle security system 100 determines that the recognized object is normal and among the normal objects in the baseline data, the vehicle security system 100 may compare the activity of the recognized object to the normal activity within the baseline data for the object. If the activity performed by the recognized object is not normal and among the normal activities performed by the object in the baseline data, the vehicle security system 100 may determine the activity of the recognized object is unusual or abnormal.

For example, if the rate of change of motion of the object exceeds the characteristics for the motion of the object within the baseline data by a threshold amount, and the motion is toward the vehicle 102a, i.e., the relative distance between the object or motion of the object and the vehicle 102a is decreasing, the vehicle security system 100 may determine that the activity of the object is unusual. In another example, if the baseline data indicates that a person in the parking lot is normal, the vehicle security system 100 may still identify the activity of the person as abnormal, such as when the person approaches the vehicle 102a in a fast-paced manner or contacts the vehicle 102a as detected by one or more sensors 120.

The unusual activity or object may not necessarily present a threat to the vehicle 102a, but rather the unusual activity or object may present a threat to another object captured within the image data. For example, the vehicle camera 120a may detect a person throwing a rock at a home or other nearby vehicle 102b within the surrounding environment of the vehicle 102a.

When the vehicle security system 100 determines that there is no unusual or abnormal activity or object, i.e., when the surrounding environment of the vehicle 102a is normal, the vehicle security system 100 continues to obtain sensor data and/or image data (202, 204) to monitor for an unusual activity or object. When the vehicle security system 100 determines that the activity or the object is unusual or abnormal, the vehicle security system 100 may activate one or more surrounding cameras.

The vehicle security system 100 may activate one or more surrounding cameras when there is an unusual activity or object near or in proximity to the vehicle 102a (214). The one or more surrounding cameras may be in addition to the vehicle camera 120a, which may already be activated. The one or more surrounding cameras may be another vehicle camera 120a on another vehicle 102b that is within a threshold distance of the vehicle 102a and/or may be an infrastructure camera 136a on an infrastructure device 106 positioned on a structure, such as a building, light post, signal post or other infrastructure, which is proximity to or is within a threshold distance of the vehicle 102a.

Each of the one or more surrounding cameras may have a different vantage point than the vehicle 102a. The different vantage points allow the one or more surrounding cameras to be positioned to capture different field-of-views than the vehicle camera 120a. This allows the vehicle security system 100 to capture image data from different perspectives, vantage points and field-of-views to capture the entire surrounding environment where the unusual activity or object occurred near or in proximity to the vehicle 102a. Subsequently, the various surrounding cameras may be used to track the unusual activity or object as the unusual activity or object advances out of the field-of-view of one camera, such as the vehicle camera 120a, and into the field-of-view of another camera, such as an infrastructure camera 136a or other vehicle camera 120a on another vehicle 102b.

Figure 3:
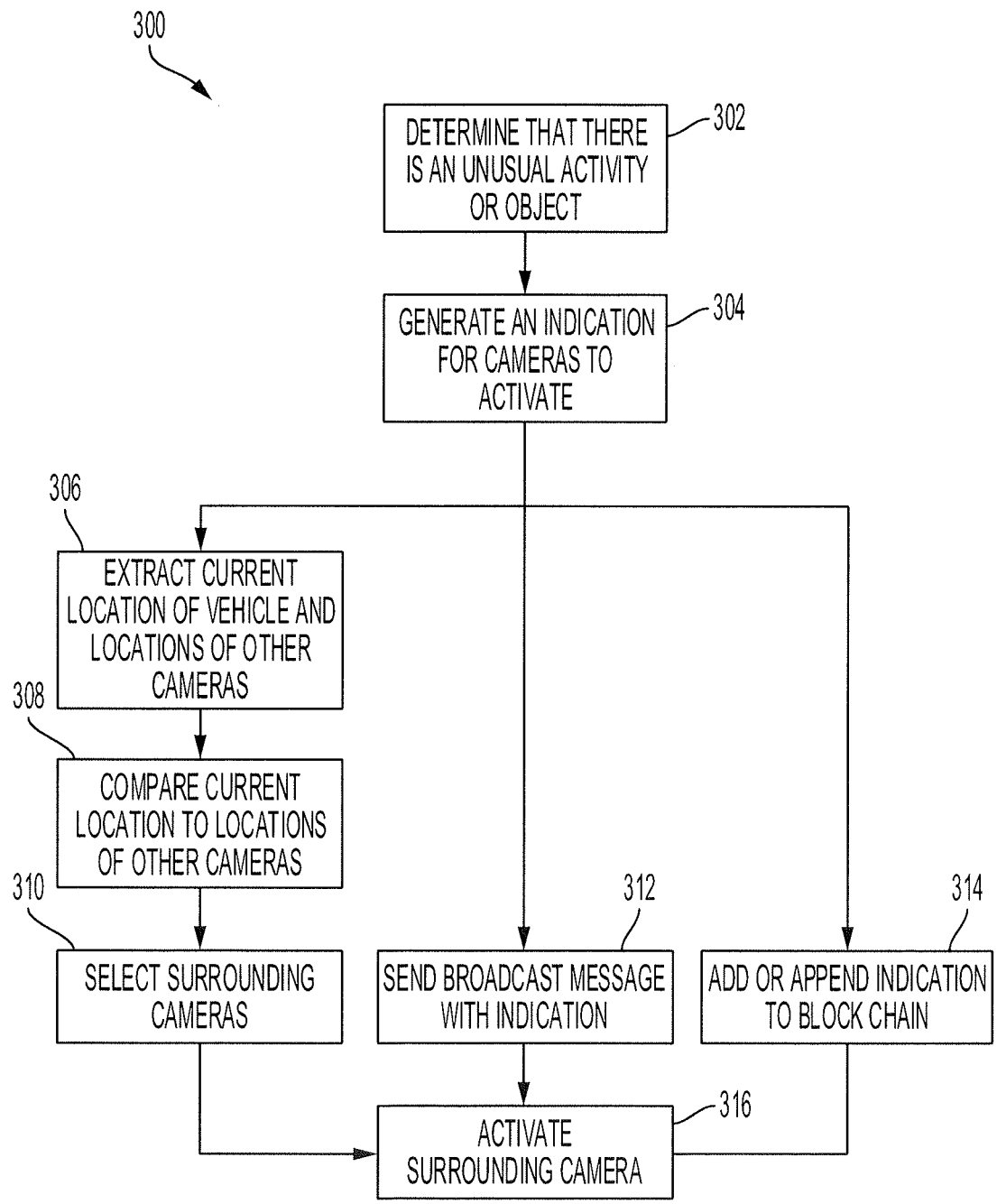
FIG. 3 is a flow diagram of an example process for determining one or more surrounding cameras to activate and capturing image data of the unusual activity or object using the vehicle security system of FIG. 1 according to an aspect of the invention.
Figure 4:
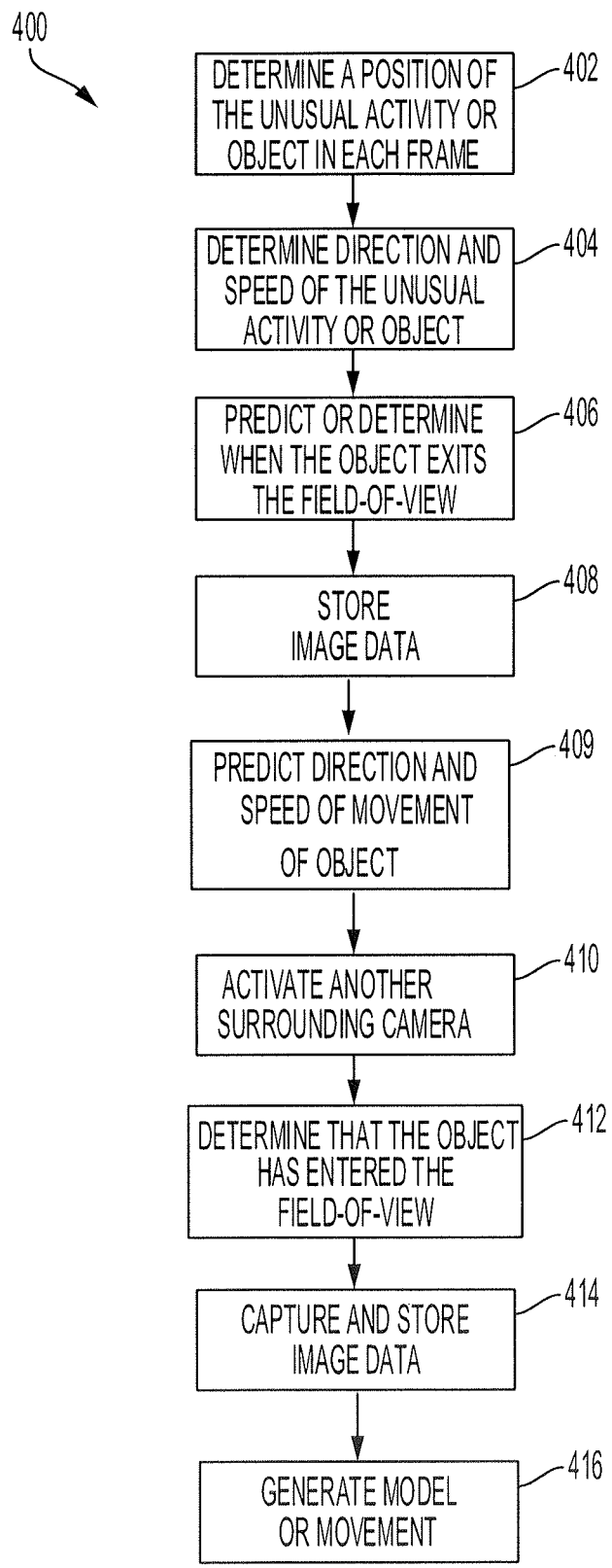
FIG. 4 is a flow diagram of an example process for tracking the unusual activity or object using the vehicle security system of FIG. 1 according to an aspect of the invention.

The vehicle security system 100 may determine the one or more surrounding cameras to activate based on the map data, navigational map information and/or the moving direction of the object. The vehicle security system 100 may determine the location of surrounding cameras in the vicinity of the vehicle 102a and activate the surrounding cameras that are within a threshold distance and direction of the vehicle 102a. FIG. 3 further describes the determination, selection and activation of the one or more surrounding cameras. As the unusual activity or object exits the field-of-view of one camera and enters the field-of-view of another camera, the vehicle security system 100 may activate another camera that captures the movement of the unusual activity or object. FIG. 4 further describes the tracking of the unusual activity or object using the various cameras.

The vehicle security system 100 stores the image data (216). The vehicle security system 100 may store the image data from vehicle camera 120a of the vehicle 102a, the one or more surrounding cameras, such as the vehicle camera 120a on the other vehicles 102b, and/or the infrastructure camera 136a on a surrounding structure. The image data from the various sources may be stored concurrently and/or simultaneously in real-time with each other.

The image data may contain or otherwise be associated with metadata or other information to be stored along with the image data. The metadata or other information may include a timestamp and/or a current location of the camera, such as the current location of the vehicle 102a-b for the vehicle cameras 120a. The timestamp and/or the current location of the camera may be used by a third party or by the vehicle security system 100 to track or locate the unusual activity or object as the unusual activity or object moves out of the field-of-view of the camera that captured the associated image data. The timestamp and/or the current location of the camera may be used to derive other information to be used by another entity, such as the direction of motion of the unusual activity or object along with the rate or speed of travel of the unusual activity or object.

The vehicle security system 100 may store the image data in the cloud or other remote storage area or server, such as within the memory 116b of the centralized tracking apparatus 104. In some implementations, the vehicle security system 100 may store the image data and/or other data on a decentralized system, such as on a blockchain. This allows the image data to be accessed or provided to other entities. Other vehicles 102b and/or infrastructure devices 106 may read the image data and/or other data from the blockchain, and determine that the vehicle 102b or infrastructure device 106 is in proximity to the vehicle 102a and activate.

Once the vehicle security system 100 captures and stores the image data, the vehicle security system 100 may alert another vehicle 102b or third-party, such as a government agency or an insurance provider, of the unusual activity or object (218). The vehicle security system 100 may alert one or more vehicles 102b that are in proximity to the vehicle 102a of the unusual activity or object via the communication device 122, e.g., using V2V communication. This allows the drivers or occupants of the surrounding vehicles 102b to be aware of the unusual activity or object and avoid the unusual activity or object. The vehicle security system 100 may also alert a third party, such as the police, of the unusual activity or object to report the unusual activity or object so that the third-party may act to resolve or prevent any issues. Similarly, the vehicle security system 100 may also alert an insurance provider of the unusual activity or object to assist in any investigation of a claim. For example, the alert may include the captured image data, metadata or other information related to the unusual activity or object to document the unusual activity or object.

FIG. 3 is a flow diagram of a process 300 for determining one or more surrounding cameras to activate and capture image data of various field-of-views of the unusual activity or object. One or more computers or one or more data processing apparatuses, for example, the ECU 112 of the vehicle security system 100 or the processor 114 of the centralized tracking apparatus 104 of the vehicle security system 100, appropriately programmed, may implement the process 300.

The vehicle security system 100 may determine that there is an unusual activity or object, as describe above (302). The determination may be based on the image data and/or sensor data. Once an unusual activity or object is determined or detected, the vehicle security system 100 may generate an indication to other cameras in the surrounding area to activate (304). The indication may include a current location of the vehicle 102a, which may have been obtained from the navigational map information, and/or the image data and/or sensor data, which may be used to determine that there is an unusual activity or object.

The vehicle security system 100 may extract the current location of the vehicle 102a from the indication and one or more locations of one or more cameras from the map data (306), compare the current location of the vehicle 102a to one or more locations of one or more cameras (308) and select the surrounding cameras that have a corresponding location within a threshold distance of the location of the vehicle 102a to activate (310). In some implementations, the vehicle security system 100 sends or transmits a broadcast message that is received by other surrounding cameras on other vehicles 102b and/or infrastructure devices 106 via V2V or V2I, respectively, that are within a threshold distance of the vehicle 102a, such as within approximately 25 feet of the vehicle 102a, which are then activated (312). In some implementations, the vehicle security system 100 may append or add the indication to a blockchain where one or more vehicle monitoring apparatuses 108 on the other vehicles 102b or an infrastructure device 106 reads the indication (314). The vehicle security system 100 may use one implementation or a combination of the different implementations to determine the one or more surrounding cameras to activate.

Once selected, read on the blockchain, or received via the broadcast message, the vehicle security system 100 activates and/or causes the vehicle monitoring apparatus 108 on the other vehicle 102b and/or infrastructure device 106 on the infrastructure to activate the other vehicle camera 120a and/or the infrastructure camera 136a (316). The activation of the surrounding cameras may be operated and activated in conjunction with or simultaneously with the vehicle camera 120*a*. In some implementations, one or more surrounding cameras may also continue to activate in a chain-reaction to track the unusual activity or object and as the unusual activity or object exits and enters the field-of-views of the various cameras. Once activated, the vehicle security system 100 captures and aggregates the image data from all of the cameras with the various vantage points, field-of-views and/or perspectives and stores the captured image data and/or provides the image data to a third-party.

Figure 5:
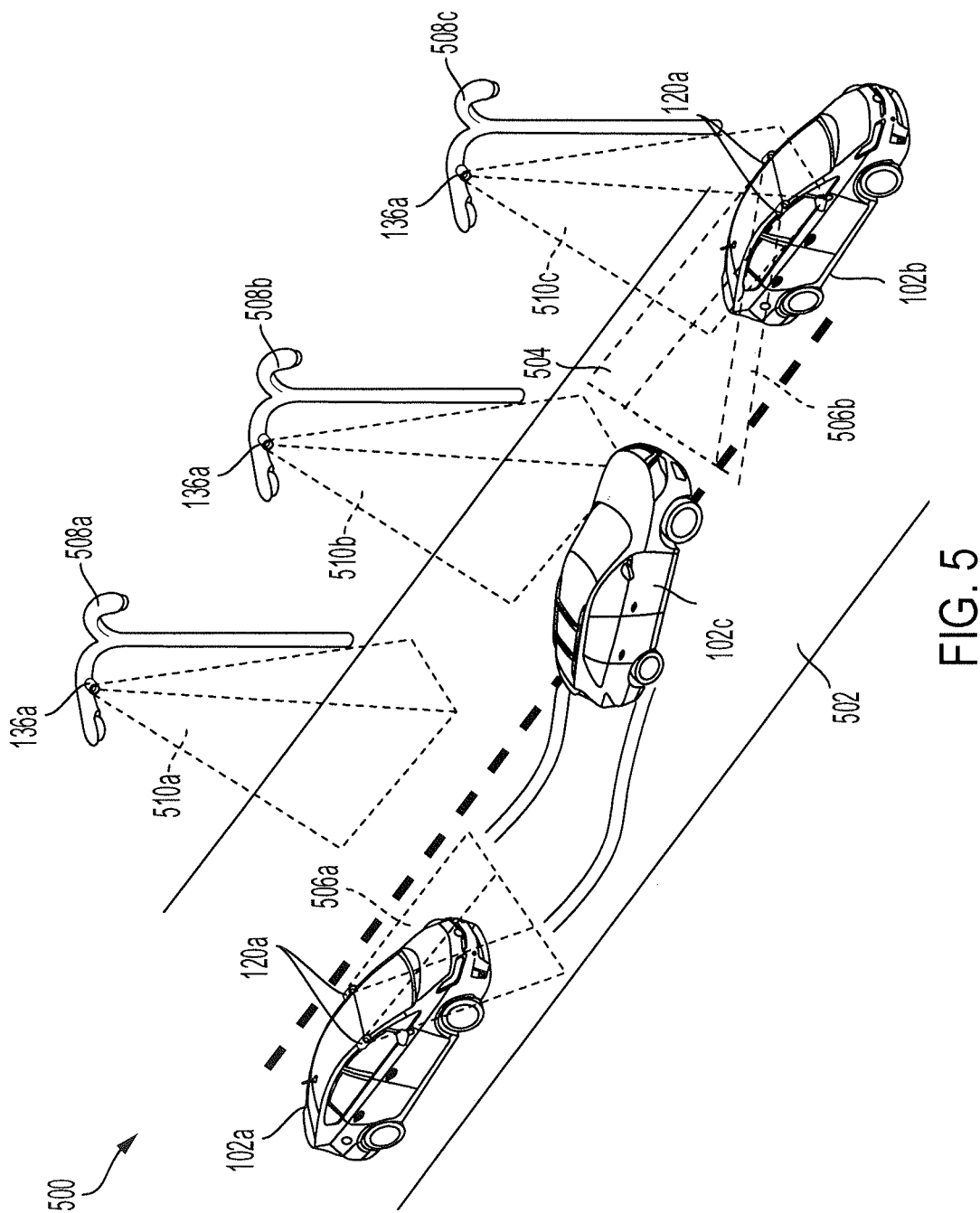
FIG. 5 shows the vehicle security system of FIG. 1 tracking the unusual activity or object according to an aspect of the invention.

FIG. 4 is a flow diagram of a process 400 for tracking the unusual activity or object. One or more computers or one or more data processing apparatuses, for example, the ECU 112 of the vehicle security system 100 or the processor 114 of the centralized tracking apparatus 104 of the vehicle security system 100, appropriately programmed, may implement the process 400. FIG. 5 shows an example use-case of tracking the unusual activity or object using the vehicle security system 100 of FIG. 1.

Once the vehicle security system 100 determines that there is an unusual activity or object within the image data and/or sensor data, the vehicle security system 100 captures and stores the image data from the vehicle camera 120*a* and the surrounding cameras on the other vehicles 102*b* and/or infrastructure 106, as described above. Then, the vehicle security system 100 begins to track the unusual activity or object as the unusual activity or object moves.

The vehicle security system 100 may determine a position of the unusual activity or object within each frame of the image data (402). The vehicle security system 100 outlines or frames the object within the image data. The outline or frame of the object includes multiple points that may be tracked or determined within each of the frames of the image data to determine the direction and speed of the movement of the unusual activity or object. For example, the vehicle camera 120*a* on the vehicle 102*a* may detect that the unusual activity, e.g., the swerving in and out of multiple lanes 502, 504 by the vehicle 102*c*, as shown in FIG. 5.

The vehicle security system 100 may determine the direction and speed of the unusual activity or object based on the position of the object throughout each frame of the image data (404). The vehicle security system 100 follows each point within the outline, shape or frame of the object as the object moves throughout each frame. As the points within the outline, shape or frame of the object move and change position, the corresponding points in each frame change in both direction and relative distance from frame to frame. The vehicle security system 100 calculates a vector that has both a direction and a velocity that describes the movement of the object through each frame based on the direction and the relative distance of the points among the various frames and the amount of time between each captured frame. For example, the vehicle security system 100 may calculate the direction and speed of the vehicle 102*b* as the vehicle 102*b* moves between the lanes 502, 504 based on the captured image data from the vehicle camera 120*a* of the vehicle 102*a*.

The vehicle security system 100 may predict or determine when the object exits a field-of-view of one camera, such as the vehicle camera 120*a* or infrastructure camera 136*a* (406). The prediction or determination may be based on the position of the object within a current frame of the image data and the determine direction and speed of the unusual activity or object. The vehicle security system 100 may use the position of other objects that are on the boundaries of the image data to calculate when the position of the object will pass the position of the other objects, and thus, the boundaries of the image data and exit the field-of-view of the camera. For example, the vehicle security system 100 may predict or determine that the vehicle 102*c* will exit the field-of-view 506*a* of the vehicle 102*a* when the vehicle 102*c* moves out of the lane 502 and into the lane 504 closer to the roadside overhead lamps 508*a-c*.

The vehicle security system 100 may continue to store the image data from the one or more cameras 120*a*, 136*a* until the unusual activity or object exits the field-of-view of the camera (408). The vehicle security system 100 may store the image data within the one or more memories 116*a-b* and/or on a blockchain.

Once the unusual activity or object exits the field-of-view of the camera or is about to exit the field-of-view of the camera, the vehicle security system 100 may predict the direction and speed of movement of the unusual activity or object based on a location of the unusual activity or object and the direction, speed and position of the unusual activity or object in the most recent frames of the image data (409). The vehicle security system 100 determines the location of the object from the location of the one or more cameras 120*a*, 136*a* currently tracking the object. The vehicle security system 100 anticipates or predicts the movement of the object from the position, direction and speed of the object throughout the previous frames of the image data along with the direction that the one or more cameras 120*a*, 136*a* currently tracking the object are directed towards. This allows the vehicle security system 100 to predict and select which surrounding cameras to activate to track the object.

The vehicle security system 100 provides an indication to activate another surrounding camera to track the unusual activity or object (410). The vehicle security system 100 may determine the one or more surrounding cameras and activate another surrounding camera that is in the direction that the object is traveling based on the prediction of the direction and/or speed of movement of the object and the locations of one or more surrounding cameras. The one or more surrounding cameras may have been extracted from the map data. The vehicle security system 100 may identify surrounding cameras that are in proximity to the unusual activity or object based on the location of the camera and the prediction of the direction of movement of the object. In some implementations, the vehicle security system 100 anticipates that the unusual activity or object is about to exit the field-of-view, and activates the surrounding camera before the previous camera loses sight of the unusual activity or object and/or before the unusual activity or object is within the field-of-view of the surrounding camera.

For example, when the vehicle 102*b* exits the field-of-view 506*a* of the vehicle camera 120*a* of the vehicle 102*a*, the vehicle security system 100 may activate or indicate to one or more infrastructure cameras 136*a* of the one or more roadside overhead lamps 508*a-c* to activate based on the direction of movement of the vehicle 102*c*. In some implementations, even though the infrastructure cameras 136*a* may be activated, the infrastructure cameras 136*a* may not necessarily be recording or storing the image data to save storage space.

The vehicle security system 100 may determine that the unusual activity or object has entered the field-of-view of the surrounding camera (412). The vehicle security system 100 may recognize or identify the unusual activity or object within the image data using object recognition. The vehicle security system 100 may compare and match the recognized unusual activity or object in the current image frame with the recognized unusual activity or object in previous image frames from the other cameras and determine that the objects are the same. For example, the vehicle security system 100 may determine that the vehicle 102c enters the field-of-view 510a of the infrastructure camera 136a positioned on the roadside overhead lamp 508a, and subsequently, exits the field-of-view 510a and enters the field-of-view 510b of infrastructure camera 136a positioned on the roadside overhead lamp 508b and the field-of-view 506b of the vehicle 102b. Thus, the vehicle camera 120a of the vehicle 102b and the infrastructure camera 136a on the roadside overhead lamp 508b will activate and record the vehicle 102c when the vehicle 102c is in the field-of-views 510b, 506b. Finally, the vehicle security system 100 may determine that the vehicle 102b exits the field-of-view 510b of the infrastructure camera 136a of the roadside overhead lamp 508b and enters the field-of-view 510c of the roadside overhead lamp 508c. When the vehicle 102b enters the various field-of-views 506a-b, 510a-c, the corresponding cameras may activate and record the image data, and then, when the vehicle 102b exits the various field-of-views 506a-b, 510a-c, the cameras may deactivate or stop recording the image data.

The vehicle security system 100 may capture, record and store the image data from the surrounding camera (414). The vehicle security system 100 may store the image data in the memory 116b or onto a blockchain when the unusual activity or object enters the field-of-view of the surrounding cameras.

Upon each activation and/or deactivation, the vehicle security system 100 may generate a model of the movement of the unusual activity or object (416). The vehicle security system 100 may map the activations and deactivations of the various cameras to generate the model. The continuous data points generated from the activations and deactivations of the various cameras along with the captured image data and other information within the image data, such as the location information and timestamp information, may form a map of the path and rate of travel of the unusual activity or object. The mapped activations and deactivations may be provided to a third-party. And, with tracking and/or historical information related to the unusual activity or object, the third-party may use the model to prevent, mitigate or document the unusual activity or object.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle security system, comprising:
   a plurality of cameras including a first camera positioned on a first vehicle and having a first field-of-view of a surrounding environment and a second camera positioned on a second vehicle or on an infrastructure and having a second field-of-view of the surrounding environment, the first camera being configured to capture first image data of the first field-of-view of the surrounding environment and the second camera being configured to capture second image data of the second field-of-view of the surrounding environment;
   a memory configured to store the first image data; and
   a processor coupled to the first camera, the second camera and the memory and configured to:
      determine that an object or an action of the object within the surrounding environment is different than a baseline of the surrounding environment based on the first image data,
      record the first image data when the object enters the first field-of-view,
      predict when the object exits the first field-of-view based on a speed of the object,
      stop recording the first image data when the object exits the first field-of-view,
      activate the second camera positioned on the second vehicle or on the infrastructure and having the second field-of-view of the surrounding environment;
      generate a map of a path of travel of the object based on locations of activations and deactivations of the plurality of cameras and timings of the activations and deactivations of the plurality of cameras; and
      provide the map of the path of travel of the object to a remote device.

2. The vehicle security system of claim 1, wherein the processor is configured to:
   obtain or determine a location of the first camera; and
   determine that a location of the second camera is within a threshold distance of the location of the first camera.

3. The vehicle security system of claim 2, wherein the processor is configured to activate the second camera based on the determination that the location of the second camera is within the threshold distance of the location of the first camera.

4. The vehicle security system of claim 1, wherein the processor is configured to:
   track a direction of movement of the object within the surrounding environment; and
   predict when the object exits the first field-of-view further based on the direction of movement of the object.

5. The vehicle security system of claim 4, wherein the processor is configured to activate the second camera to capture the second image data of the second field-of-view of the surrounding environment before the object enters the second field-of-view.

6. The vehicle security system of claim 1, wherein the processor is configured to:
   store and capture, in the memory and using the second camera, the second image data.

7. The vehicle security system of claim 1, wherein the processor is an electronic control unit included within or coupled to the first vehicle.

8. The vehicle security system of claim 7, further comprising:
   a communication device coupled to the first vehicle and configured to communicate with the second vehicle;
   wherein the electronic control unit is configured to:
   transmit a signal to the second vehicle to activate the second camera.

9. A security system, comprising:
   a sensor configured to detect sensor data;
   a plurality of cameras including a first camera configured to capture first image data of a first field-of-view of a surrounding environment and a second camera positioned on an infrastructure and configured to capture second image data of a second field-of-view of the surrounding environment;
   a memory configured to store the first image data and the second image data; and
   a processor configured to:
      determine that an object or an action of the object within the surrounding environment is different than a baseline of the surrounding environment based on the first image data or the sensor data, record the first image data when the object enters the first field-of-view, stop recording the first image data when the object exits the first field of view, determine that the second camera is within a threshold distance of the first camera, activate the second camera to capture the second image data of the second field-of-view of the surrounding environment, and generate a map of a path of travel of the object based on locations of activations and deactivations of the plurality of cameras and timings of the activations and deactivations of the plurality of cameras.

10. The security system of claim 9, wherein to determine that the second camera is within the threshold distance of the first camera the processor is configured to:

obtain or determine a location of the first camera; and compare a location of the second camera to the location of the first camera.

11. The security system of claim 9, wherein the processor is configured to:

track a direction of movement of the object within the surrounding environment; and determine that the object will exit the first field-of-view and that the object will enter the second field-of-view based on the direction of movement of the object and a speed of the object.

12. The security system of claim 11, wherein the processor is configured to activate the second camera to capture the second image data of the second field-of-view of the surrounding environment before the object enters the second field-of-view.

13. The security system of claim 9, wherein the processor is configured to:

store and capture, in the memory and using the second camera, the second image data.

14. The security system of claim 9, wherein the processor is configured to:

transmit a signal to the second camera to activate based on the determination that the object or the action of the object within the surrounding environment is different than the baseline of the surrounding environment.

15. The security system of claim 9, wherein the infrastructure is one of a building, a road sign, a traffic signal or a lamp post in proximity to the first camera.

16. A method of capturing image data, comprising:

capturing, using a first camera positioned on a first vehicle, first image data of a first field-of-view of a surrounding environment;

determining, by a processor, that an object or an action of the object within the surrounding environment is unusual;

recording, by the processor, the first image data when the object enters the first field-of-view of the surrounding environment;

predicting, by the processor, when the object exits the first field-of-view based on a speed of the object;

stop recording, by the processor, the first image data when the object exits the first field-of-view of the surrounding environment;

determining, by the processor, that a second camera is within a threshold distance of the first camera;

determining, by the processor, that the second camera is in a direction of movement of the object;

activating, by the processor, the second camera to capture the second image data of a second field-of-view of the surrounding environment; and generating, by the processor, a map of a path of travel of the object based on locations of activations and deactivations of the first camera and the second camera and timings of the activations and deactivations of the first camera and the second camera.

17. The method of claim 16, further comprising:

tracking the direction of movement of the object within the surrounding environment; and predicting, by the processor, when the object exits the first field-of-view further based on the direction of movement of the object.

18. The method of claim 17, further comprising:

activating the second camera to capture the second image data of the second field-of-view of the surrounding environment before the object enters the second field-of-view.

19. The method of claim 18, further comprising:

storing, in a memory, the first image data and the second image data concurrently.

20. The method of claim 17, further comprising:

obtaining a location of the first camera;

wherein determining, by the processor, that the second camera is within the threshold distance of the first camera includes comparing the location of the first camera to a location of the second camera.

* * * * *